(12) United States Patent
Kelley et al.

(10) Patent No.: US 6,247,029 B1
(45) Date of Patent: Jun. 12, 2001

(54) WEB BROWSER FORM ENHANCEMENTS

(75) Inventors: Edward E. Kelley, Wappingers Falls; Norman J. Dauerer, Hopewell Junction, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/071,410

(22) Filed: May 1, 1998

(51) Int. Cl.⁷ .................................................. G06F 17/24
(52) U.S. Cl. .......................... 707/507; 707/505; 707/508
(58) Field of Search ................................... 707/501, 505, 707/507, 506, 508

(56) References Cited

U.S. PATENT DOCUMENTS

| 4,763,356 | | 8/1988 | Day, Jr. et al. . | |
| 5,530,759 | | 6/1996 | Braudaway et al. . | |
| 5,647,056 | | 7/1997 | Barrett et al. . | |
| 5,721,940 | * | 2/1998 | Luther et al. ......................... | 395/761 |
| 5,794,259 | * | 8/1998 | Kikinis ................................ | 707/507 |
| 5,911,141 | * | 7/1999 | Kelly et al. .......................... | 707/505 |

OTHER PUBLICATIONS

IBM Technical Disclosure Bulletin,, "Temporary Global Passwords", Viol. 36, No. 03, Mar. 1993; pp. 451–453.
IBM Technical Disclosure Bulletin, "Resource Access Control Facility Password Propagation for Multiple Virtual Storage", vol. 36, No. 06B, Jun. 1993; pp. 419–420.
IBM Technical Disclosure Bulletin, "Network Signon Coordination Configuration", vol. 36, No. 12, Dec. 1993; pp. 389–396.
Canon Internet Web Page, Put the Power of the Web in Print, www.ccsi.canon.com/webrecord/, down loaded Apr. 24, 1997.

* cited by examiner

Primary Examiner—Stephen S. Hong
(74) Attorney, Agent, or Firm—DeLio & Peterson, LLC; Peter W. Peterson; Aziz M. Ahsan

(57) ABSTRACT

A process and system for entering and retrieving previously stored data at a client computer in an HTML form accessed from an intra- or internet source. A set of data in a form file is provided in a program storage device accessible by the client computer. The form file further contains information concerning time of creation of the data and a unique identification which distinguishes the form file from other forms. A blank form is then accessed from an intra- or internet source and viewed on the client computer. The form file is then accessed from the program storage device and data from the form file is utilized to complete the blank form and the completed form is transmitted to the intra- or internet source. Each form file may be stored as an HTML source file combined with a set of data for the source file, and the program storage device includes a combined form table containing a list of the form files. Alternatively, the form file includes a plurality of sets of data, the sets of data being for a plurality of HTML source files previously accessed, and the program storage device further includes a separate form table containing a list of HTML source files previously accessed from the intra- or internet source.

27 Claims, 6 Drawing Sheets

WEB BROWSER FORM ENHANCEMENTS

BACKGROUND OF THE INVENTION

1. Field of the Invention

The present invention relates to computer programs and in particular to software for entering data at a client computer in a form accessed from an intra- or internet source, which software may be incorporated into a web browser.

2. Description of Related Art

Users of intra-active (i.e., intra-net) or internet websites often are required to provide data in utilizing such web sites. Often, such data comprises standard and often repetitive information such as name, address, telephone number, fax number, e-mail address and the like. Such repetitive data may have to be re-entered even when accessing the same HTML (Hyper Text Markup Language) source file at the same web site. In other instances, similar information may have to be provided for different web sites.

Current web browsers have no way of saving data from previously completed forms, and allowing users to select the saved data to load into a new form. In the manner HTML source file forms are currently processed, a blank form is presented each time a form is presented. There is currently no automatic and convenient way to do this for any form, nor is there a way to have this capability controlled by the client with the web browser using personal storage. There is also currently no way to automatically save multiple forms of data and to allow a user to select from the list of previously data and saved forms to input the selected data on the form currently being accessed.

Accordingly, it would be useful to have a process and system for entering saved data from previously completed forms into new blank forms, and to automatically save multiple forms of data for access in completing new blank forms.

Bearing in mind the problems and deficiencies of the prior art, it is therefore an object of the present invention to provide a process and system for simplifying entry of data at a client computer in a blank form accessed from an intra- or internet source.

It is another object of the present invention to provide a process and system for saving data entered into a blank form for a possible future use in the same or other blank form.

A further object of the invention is to provide such a process and system that may be incorporated in a web browser which is accessed at a client computer or workstation which has access to a personal storage device containing such previously saved data.

It is yet another object of the present invention to provide such a process and system which may be easily accessed by a client computer or a workstation.

SUMMARY OF THE INVENTION

The above and other objects and advantages, which will be apparent to one of skill in the art, are achieved in the present invention which is directed to, in a first aspect, a process for entering data at a client computer in a form accessed from an intra- or internet source. The process initially comprises providing a set of data in a form file in a program storage device accessible by the client computer, the form file further containing information concerning time of creation of the data and a unique identification which distinguishes the form file from other forms. The blank form is then accessed from an intra- or internet source and viewed on the client computer. The form file is then accessed from the program storage device and data from the form file is utilized to complete the blank form.

Preferably, process includes the further step of transmitting the completed blank form to the intra- or internet source.

In one embodiment, the form file is stored as an HTML source file. The form file may include an HTML source file previously accessed from an intra- or internet source combined with a set of data for the source file, and the process may include accessing the form file from the program storage device and determining if the blank form corresponds to the form file. The program storage device then includes a plurality of form files, each of which includes an HTML source file previously accessed from an intra- or internet source combined with a set of data for the source file and containing information concerning time of creation of the form and a unique identification. The program storage device may further include a combined form table containing a list of the form files. The process then includes accessing the combined form table from the program storage device and determining if the blank form corresponds to the form file.

In another embodiment, the form file includes a plurality of sets of data, the sets of data being for a plurality of HTML source files previously accessed from an intra- or internet source. The process then includes the step of accessing one of the sets of data to complete the blank form. The program storage device further includes a separate form table containing a list of a plurality of HTML source files previously accessed from an intra- or internet source and information concerning time of saving of the source file and a unique identification for each source file. The process then includes the step of accessing the separate form table from the program storage device and determining if the blank form corresponds to one of the HTML source files.

In another aspect, the present invention relates to a system for entering data at a client computer in a form accessed from an intra- or internet source. The system includes a client computer capable of accessing a blank form from an intra- or internet source and viewing the blank form and a program storage device accessible by the client computer. A set of data containing data adapted for use by the client computer to complete the blank form is stored in a form file in the program storage device. The form file also contains information concerning time of creation of the data and a unique identification which distinguishes the form file from other forms.

In one embodiment, the program storage device includes a plurality of form files, each of which includes an HTML source file previously accessed from an intra- or internet source combined with a set of data for the source file and containing information concerning time of creation of the data and a unique identification. The program storage device also includes a combined form table containing a list of the form files.

In another embodiment, the program storage device includes a separate form table containing a list of a plurality of HTML source files previously accessed from an intra- or internet source and information concerning time of saving of the source file and a unique identification for each source file. The form file includes a plurality of sets of data, with the sets of data being for the HTML source files.

In a further aspect, the present invention relates to a process for entering data at a client computer in a form accessed from an intra- or internet source. The process comprises accessing a blank form from an intra- or internet source and viewing the blank form on the client computer. A set of data is then entered in the client computer to complete the blank form. A form file containing the set of data used to complete the blank form is then stored in a program storage device accessible by the client computer. The form file further contains information concerning time of creation of the data and a unique identification which distinguishes the form file from other forms. Preferably, the process further includes accessing the form file from the program storage device and utilizing data from the form file to complete another blank form accessed from an intra- or internet source. The completed blank form may be transmitted to the intra- or internet source.

In one embodiment, the form file is stored as an HTML source file. In such an instance, the stored form file includes the HTML source file combined with the set of data used to complete the source file. The program storage device may further include a combined form table containing a list of HTML source files previously accessed from an intra- or internet source and information concerning time of saving of the source file and a unique identification for each source file. The process then includes the step of updating the combined form table to include the stored source file.

In another embodiment, the blank form is an HTML source file and the process includes the steps of accessing and viewing a plurality of blank form HTML source files, entering sets of data to complete the blank form HTML source files, and storing the sets of data in the form file, such that the form file includes a plurality of the sets of data. The process then further includes storing in the program storage device a separate form table containing a list of the blank form HTML source files and information concerning time of saving of the source file and a unique identification for each source file. The separate form table is stored separately from the form file.

In yet another aspect, the present invention provides a system for entering data at a client computer in a form accessed from an intra- or internet source comprising a client computer capable of accessing a blank form from an intra- or internet source and viewing the blank form and a program storage device accessible by the client computer. The program storage device further has a program of instructions executable by the computer to save data in a form accessed from the intra- or internet source. The instructions comprise receiving a set of data to complete the blank form and storing in the same or a different program storage device accessible by the client computer a form file containing the set of data used to complete the blank form. The stored form file further contains information concerning time of creation of the data and a unique identification which distinguishes the form file from other forms.

In one embodiment, the blank form is an HTML source file and the instructions include storing the HTML source file combined with the set of data used to complete the source file.

In another embodiment, the blank form is an HTML source file and the form file includes a plurality of the sets of data. In this instance, the program storage device containing the form file further includes a separate form table containing a list of the blank form HTML source files and information concerning time of saving of the source file and a unique identification for each source file. The separate form table is stored separately from the form file.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
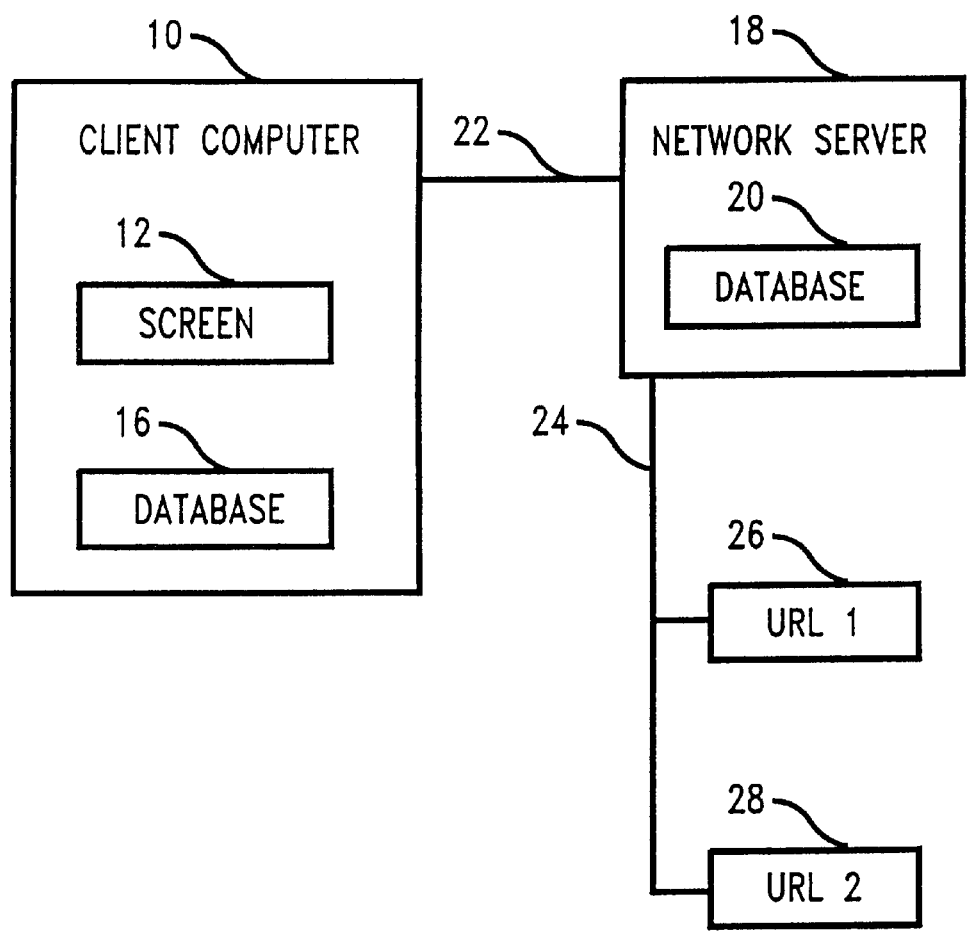
FIG. 1 is a schematic of the system of the present invention for entering data at a client computer in a form accessed from an intra- or internet source.

In describing the preferred embodiment of the present invention, reference will be made herein to FIGS. 1–6 of the drawings in which like numerals refer to like features of the invention. Features of the invention are not necessarily shown to scale in the drawings.

The present invention permits a user at a remote client computer workstation, through a web browser connected to an intra- or internet source, to store form data for any form that is viewable on the web browser. Additionally, multiple sets of form data may be stored for each unique form. Any member of the set of form data for a unique form is capable of being accessed when a form is presented by the browser. The user has the option of substituting a previously filled-in form for the one presently on the web browser screen. The form can then be modified as desired, then submitted for processing. The form data can then be added to the set of previously filled-in form data for that form.

Definitions relevant to the present invention are as follows:

HTML—Hypertext Markup Language.

HTML tags—Sections of text marked with < and > symbols to indicate the meaning of each part of the HTML document.

HTML source file—File with the HTML tags to be converted by a web browser to be displayed on a monitor.

URL (Uniform resource locator)—A text string that indicates the server protocol to use in accessing the resource, the internet domain name of the server, and the name and location of the resource on that particular server.

Personal storage—This is storage to which the user at the client computer or workstation has read and write access. The storage could include the workstation hard drive and any other program storage device that to which the workstation has read and write access.

Option 1—This option stores the form HTML source file and the data separately. Only one unique form HTML source file is stored for any number "N" of filled-in forms. The form file for this option contains the data for the different HTML source files as a string of data.

Form table B (combined form table)—A table containing a list of forms previously saved with option 1, each with the form base number, the form URL, the form CRC number, the date and time and the form data expressed as a string.

Option 2—This option stores the form HTML source file and the data together. The form HTML source file is stored in a form file for each filled-in form.

Form table (separate form table)—A table containing a list of form files previously saved with option 2, each with a form base number, a form URL, a form CRC and a date and time.

Form base number—A number that is used for identifying the stored forms. It is a unique number assigned to a form URL or a form URL with a unique CRC number. The form base number is sequential.

Form data base—A data base that contains saved filled-in forms in HTML source file format. The form base number differentiates the form files in the data base.

CRC—Cyclic redundancy check.

CRC number—Number, usually hexadecimal, produced by a cyclic redundancy check. The CRC number is created by a polynomial which indicates a unique number for a data file, which number changes every time the data file is modified.

A typical client/network system is illustrated in FIG. 1. Client computer or network work station 10 is linked by telephone or other network cable 22 to a network server computer 18 having a database 20. Such server or database may be on the Internet or on an intranet system. Client computer 10 has a microprocessor for executing stored programs and includes a database 16 on its program storage device for storage of the saved, completed form files containing data. Alternatively, such forms may be stored on database 20 on the network server 18. A screen 12 is able to display the desired web pages or other files that the service has accessed from the network. Web sites or applications 26, 28 connected to network 24 have different addresses (URLS) and may require the same or different forms to be filled out if the website is interactive. Such forms may include spaces for data such as names, address, telephone numbers, e-mail addresses and other information which is typically uploaded to a network server by user, or may contain further detailed data. Data bases 16 and 20 may be physically present in the client computer or network server, but may also be located elsewhere, so long as the client computer has access to the information therein.

The computer programmer software incorporating the process steps and instructions described further below, as well as the saved data, may be stored in both client computers and network server on an otherwise conventional program storage device, such as a semiconductor chip, a read only memory, or magnetic media such as a diskette or computer hard drive, which is readable and executable by a computer in conjunction with a web browser such as Netscape Navigator.

When a user initially desires to save a form, the user may access a frequently used form from the network for example from URL1 (26) or URL2 (28) as shown in FIG. 1. The user at the client computer can then fill in the form and store the form, for example, on database 16 or database 20. In storing the form, the user may use a first option (Option 1) wherein the HTML source file containing the form and the data for such form are stored separately. In this option, the blank HTML source files are saved in personal storage along with a separate form file or form table (also referred to as form table B) containing a master list of all of the previously filled-in data, expressed as a string, stored for all of the saved HTML source file forms. This form table B also contains the form base number, form CRC number and the date and time that the form and form data was saved in order to compare the saved HTML source file with the blank HTML source file being viewed by the user, to determine if the saved HTML source file is the correct one.

In the alternative, the user may utilize a second option (option 2) in which the HTML source file containing the form and the data for the form are stored in a single data file. Unlike the first option, both the blank HTML source file and the previously filled-in data are stored together, and a separate data file or form file is created for each HTML source file. A separate form table contains a list of the separate option 2 form files, wherein each listed HTML source file is identified with a form base number, a form URL, a form CRC number and the date and time that the HTML source file and form data were saved. As before, the form base number, form CRC number and the date and time permit comparison of the saved HTML source file with the blank HTML source file being viewed by the user to determine if the saved HTML source file is the correct one.

Figure 2:
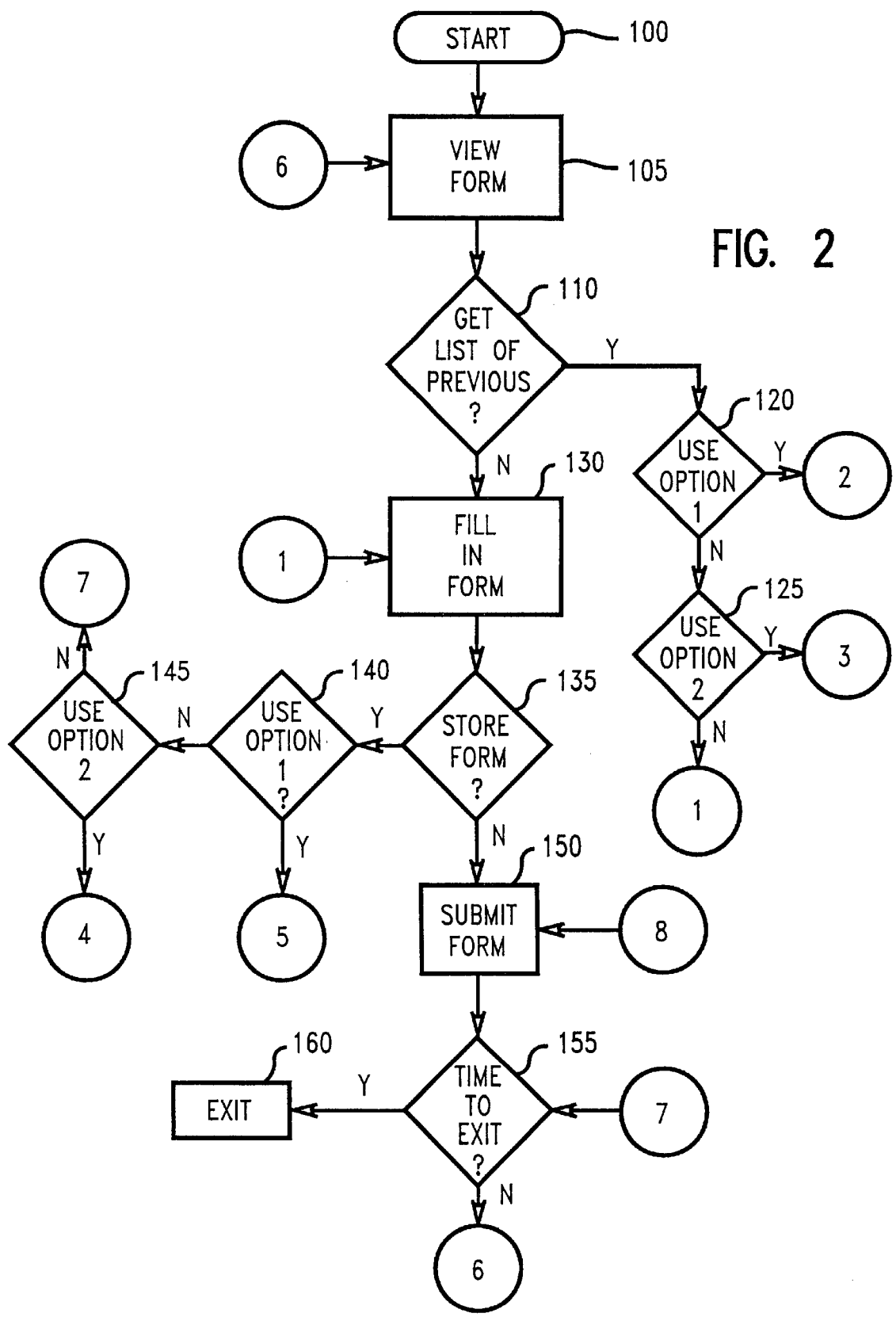
FIGS. 2–6 are block diagram flow charts of the preferred steps employed in practicing the present invention, where encircled numerals indicate links between the steps.

Flow charts for the process used in the present invention are shown in FIGS. 2–6. Numerals in circles indicate connections to and from other parts of the flow chart which may be in different figures. FIG. 2 illustrates the overall use of the processing system of the present invention to enter previously saved data for a blank form under either option 1 or 2, as well as saving entered data in a blank form, under option 1 or 2. The preferred steps are as follows:

100—Start. Start the process.
105—View form. View the form on a web browser and capture the form URL.
110—Get list of previous? Does the user want to get the list of previous forms that were filled out?
120—Use Option 1? Does the user want to use option 1 to find the stored list of forms?
125—Use Option 2? Does the user want to use option 2 to find the stored list of forms?
130—Fill in form. The user manually fills in the form with requested information.
135—Store form? Does the user want to store the form?
140—Use option 1? Does the user want to use option 1 to store the form?
145—Use option 2? Does the user want to use option 2 to store the form?
150—Submit form. Submit the form using a web browser.
155—Time to exit? Does the user want to exit the process?
160—Exit. Exit the process.

Figure 3:
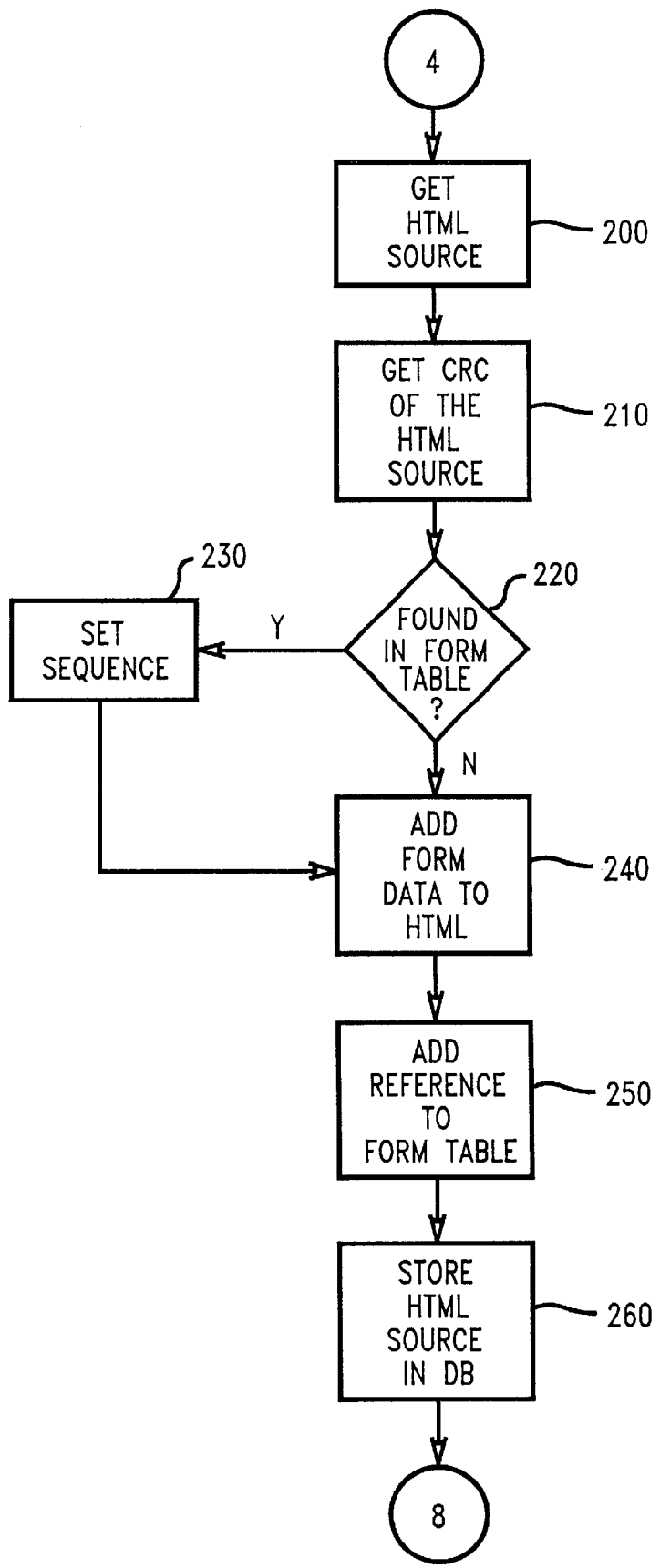

FIG. 3 illustrates the process and system for storage of the HTML source file and data together in accordance with option no. 2. The preferred steps are as follows:

200—Get the HTML source. Get the HTML source file from personal storage device.
210—Get CRC of the HTML source. Get the CRC number of the HTML source file of the form that the user is viewing, by doing a cyclic redundancy check of the form. Create a new form base number. The form base number is a sequential number which is created by adding one to the highest form base number in the form table.
220—Found in form table? Has the form URL and CRC source number of the form been found in the form table?
230—Set sequence. There may be one or more forms that have the same URL as the form that the user is viewing. Some of these forms will have a different CRC number which indicates that the original form has been modified over time. Capture the position of the last stored form for a unique form URL in the form table. The purpose of this is to group similar forms in the form table.
240—Add form data. Add the filled-in form data to the HTML source file. This means that the form data that has been entered on the screen is added to a copy of the HTML source file (from personal storage) that presented the form.
250—Add reference to form table. Add the form base number, form URL, the form CRC number and the date and time to the form table. Position the reference under the last form URL if form URL has been previously added to the form table. Otherwise add the reference to the bottom of the form table.

260—Store HTML source in data base. Store the HTML source file with the included filled-in form data in the form data base in personal storage. Use the URL and the CRC number of the form as the key.

Figure 4:
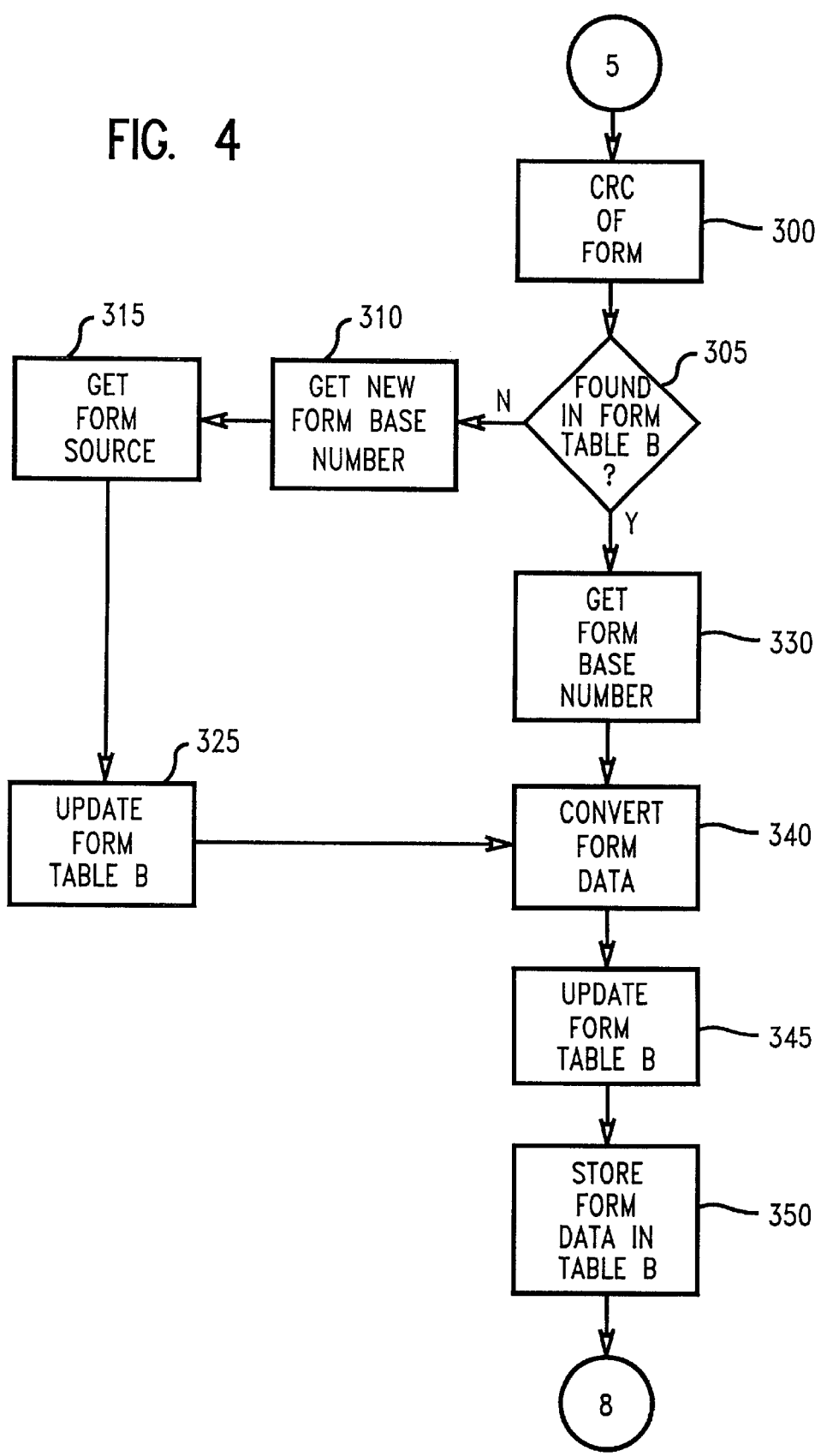

FIG. 4 illustrates the process and system for storage of HTML source file and data separately in accordance with option no. 1. The preferred steps are as follows:

300—CRC of form. Do a cyclic redundancy check of the form HTML source to produce a CRC number.
305—Found in form table B? Has the form been found in form table B. Use the form URL and CRC number and compare to the form URL and CRC number in table B.
310—Get new form base number. This is a sequential number and is one more than the last form base number listed in table B.
315—Get form source. Get the form HTML source file that the user has filled in with the form data.
320—Store in form data base. Store the form in the form data base in personal storage. Use the form base number and the form CRC number as a key.
325—Update form table B. Update form table B with the form base number, the form URL, and the form CRC number.
330—Get form base number.
340—Convert form data. Convert the form data to a string, filling in the blanks with an unprintable character and using a blank as the delimiter between the fields. Add a character to indicate a line break for fields that span more than one line.
345—Update form table B. Update form table B with the form date and time.
350—Store form data in table B. Store the form data in table B as a string. Use the form base number, form URL and the form CRC number as the key.

Figure 5:
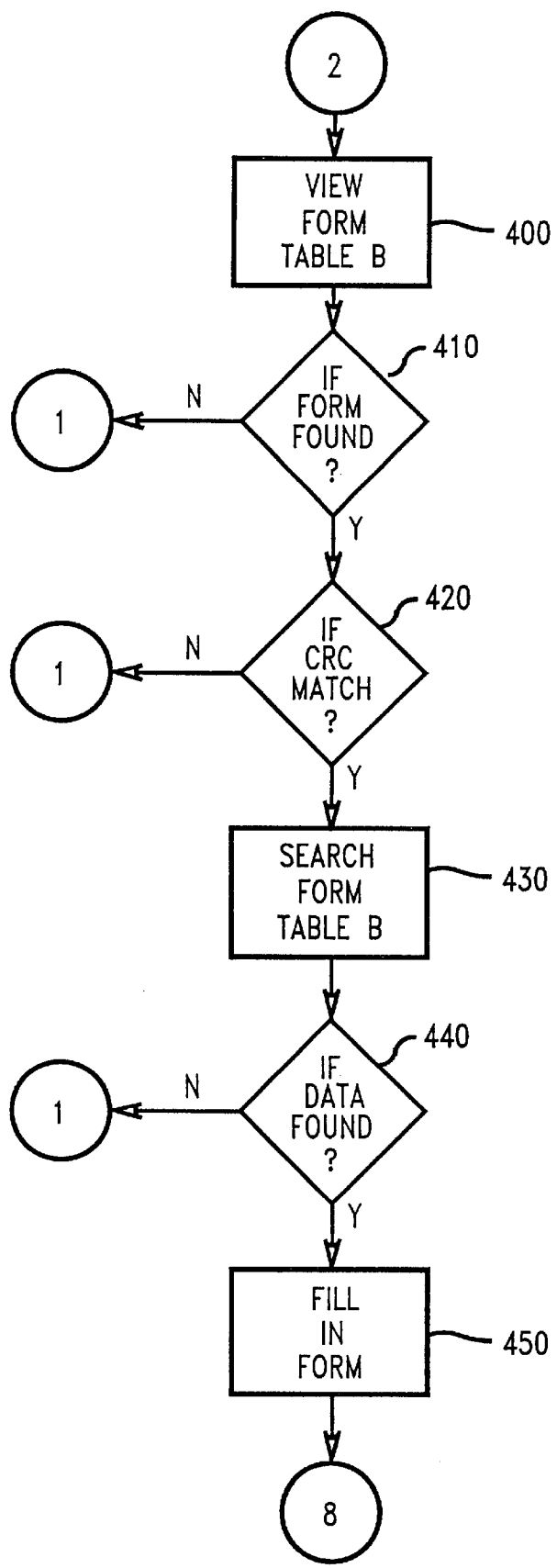

FIG. 5 illustrates the retrieval of the HTML source file and data separately in accordance with option no. 1. The preferred steps are as follows:

400—View form table B.
410—If form found? Has the form URL been found in form table B?
420—If CRC match? Do the form URL and form CRC number that the user is viewing have a match with a form URL and form CRC number in table B?
430—Search form table B. Search the list of forms that have been previously filled out in form table B for the form URL and form CRC number of the form that the user is viewing. Present a list of all forms whose URL and CRC number match the form we are viewing.
440—If data found? Has the user found a previously filled out form that the user wishes to select?
450—Fill in form. Move the data from form table B to the form that the user is viewing. This will require moving each field from the saved string, replacing the unprintable character with a blank and loading each field in the form. Where fields in the form have multiple lines represented in the string, then these will be loaded in multiple lines in the form. Modify the data as required.

Figure 6:
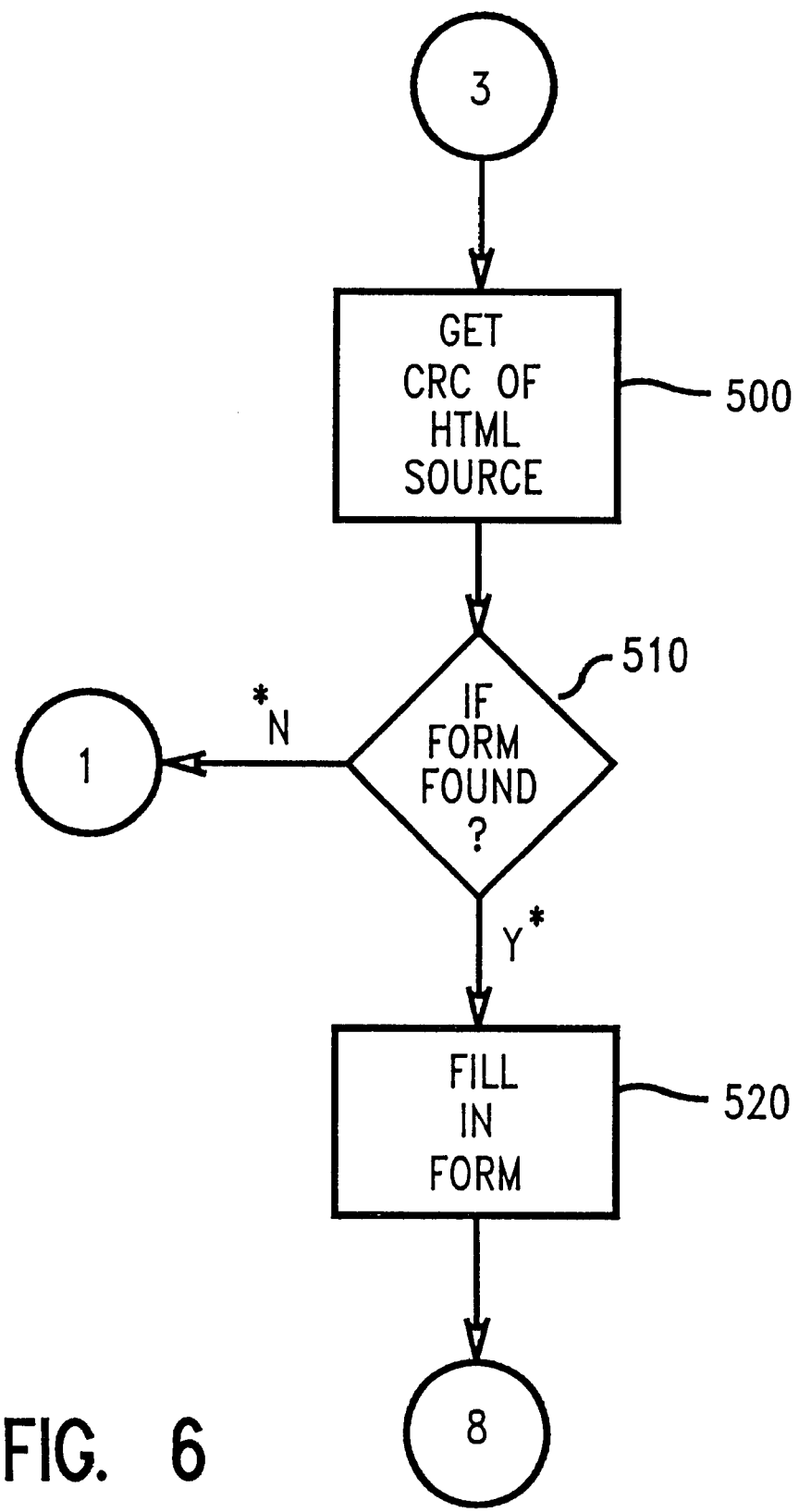

FIG. 6 illustrates the retrieval of HTML source file and data storage together in accordance with option no. 2. The preferred steps are as follows:

500—Get CRC of HTML source. Get the CRC number of the HTML source file, by doing a cyclic redundancy check on the form.
510—If form has been found? Use the CRC number of the HTML source file and the URL of the form that the user is viewing and search the form data base for a stored form that matches the form that the user is viewing. There may be several matches found with the same URL and CRC number. Each match will have a different form base number indicating a different set of form data.
520—Fill in form. Select the form from the form data base. Fill in form that the user is viewing by replacing the viewed form with the stored form in the form table. Modify the data as required.

Accordingly, it is shown that the present invention provides efficient processing system for both storing and entering data and blank form accessible to a client computer over an intra- or internet. The invention permits data to be saved in more than one manner, and to be entered into blank forms accessed by the user at the client computer. The optional storage systems for such data may be chosen depending on the specific needs of the user and may be utilized in connection with a standard web browser.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for entering data at a client computer in a form accessed from an intra- or internet source comprising:
   a) providing a set of data in a form file in a program storage device accessible by said client computer, said data corresponding to data in a single previously filled-in form from an intra- or internet source having a plurality of data spaces, said form file further containing information concerning time of creation of the data and a unique identification which distinguishes said form file from other forms, said unique identification including an identification for said previously filled-in form from an intra- or internet source;
   b) accessing a blank form from an intra- or internet source, said blank form having a plurality of blank data spaces for filling in data;
   c) viewing said blank form on said client computer;
   d) determining if the blank form accessed from the intra- or internet source corresponds to said previously filled-in form from an intra- or internet source by using said unique identification;
   e) accessing said form file from said program storage device if it is determined that the blank form accessed from the intra- or internet source corresponds to said previously filled-in form from an intra- or internet source; and
   f) utilizing data from said form file to complete the blank data spaces in said blank form.

2. The process of claim 1 including the further step of transmitting the completed form to said intra- or internet source.

3. The process of claim 1 wherein said form file is stored as an HTML source file.

4. The process of claim 1 wherein said form file includes an HTML source file previously accessed from an intra- or internet source combined with a set of data for said source file, and wherein said process includes accessing said form file from said program storage device and determining if said blank form corresponds to said form file.

5. The process of claim 1 wherein said form file includes an HTML source file previously accessed from an intra- or internet source combined with a set of data for said source file, and said program storage device further includes: i) a plurality of form files, each of which includes an HTML source file previously accessed from an intra- or internet source combined with a set of data for said source file and containing information concerning time of creation of the form and a unique identification, and ii) a combined form table containing a list of said form files, and wherein said process includes accessing said combined form table from said program storage device and determining if said blank form corresponds to said form file.

6. The process of claim 1 wherein said form file includes a plurality of sets of data, said sets of data being for a plurality of HTML source files previously accessed from an intra- or internet source, and wherein said process includes the step of accessing one of said sets of data to complete said blank form.

7. The process of claim 1 wherein said program storage device further includes a separate form table containing a list of a plurality of HTML source files previously accessed from an intra- or internet source and information concerning time of saving of the source file and a unique identification for each source file, and wherein said form file includes a plurality of sets of data, said sets of data being for said HTML source files, and wherein said process includes the step of accessing said separate form table from said program storage device and determining if said blank form corresponds to one of said HTML source files.

8. A system for entering data at a client computer in a form accessed from an intra- or internet source comprising:
a client computer capable of accessing a blank form from an intra- or internet source and viewing said blank form, said blank form having a plurality of blank data spaces for filling in data;
a program storage device accessible by said client computer; and
a set of data containing data adapted for use by said client computer to complete the blank spaces in said blank form in a form file in said program storage device, said data corresponding to data in a single previously filled in form from an intra- or internet source having a plurality of data spaces, said form file containing information concerning time of creation of the data and a unique identification which distinguishes said form file from other forms, said unique identification including an identification for said blank form.

9. The system of claim 8 wherein said program storage device includes: i) a plurality of form files, each of which includes an HTML source file previously accessed from an intra- or internet source combined with a set of data for said source file and containing information concerning time of creation of the data and a unique identification, and ii) a combined form table containing a list of said form files.

10. The system of claim 8 wherein said program storage device includes a separate form table containing a list of a plurality of HTML source files previously accessed from an intra- or internet source and information concerning time of saving of the source file and a unique identification for each source file, and wherein said form file includes a plurality of sets of data, said sets of data being for said HTML source files.

11. A process for entering data at a client computer in a form accessed from an intra- or internet source comprising:
a) accessing a blank form from an intra- or internet source, said blank form having a plurality of blank data spaces for filling in data;
b) viewing said blank form on said client computer;
c) entering a set of data to complete the blank spaces in said blank form; and
d) storing in a program storage device accessible by said client computer a form file containing said set of data used to complete the blank spaces in said blank form, said form file further containing information concerning time of creation of the data and a unique identification which distinguishes said form file from other forms, said unique identification including an identification for said blank form.

12. The process of claim 11 further including the steps of:
e) accessing said form file from said program storage device; and
f) utilizing data from said form file to complete another blank form accessed from an intra- or internet source.

13. The process of claim 11 including the further step of transmitting the completed blank form to said intra- or internet source.

14. The process of claim 11 wherein said form file is stored as an HTML source file.

15. The process of claim 11 wherein said blank form is an HTML source file and step (d) includes storing said form file includes said HTML source file combined with said set of data used to complete said source file.

16. The process of claim 14 wherein said program storage device further includes a combined form table containing a list of HTML source files previously accessed from an intra- or internet source and information concerning time of saving of the source file and a unique identification for each source file, and further including the step of updating the combined form table to include the source file stored in step (d).

17. The process of claim 11 wherein said blank form is an HTML source file and further including the steps of accessing and viewing a plurality of blank form HTML source files, entering sets of data to complete said blank form HTML source files, and storing said sets of data in said form file, such that said form file includes a plurality of said sets of data.

18. The process of claim 17 further including storing in said program storage device a separate form table containing a list of said blank form HTML source files and information concerning time of saving of the source file and a unique identification for each source file, said separate form table being stored separately from said form file.

19. A system for entering data at a client computer in a form accessed from an intra- or internet source comprising:
a client computer capable of accessing a blank form from an intra- or internet source and viewing said blank form, said blank form having a plurality of blank data spaces for filling in data; and
a program storage device accessible by said client computer, said program storage device further having a program of instructions executable by the computer to save data in a form accessed from said intra- or internet source comprising:
a) receiving a set of data to complete the blank spaces in said blank form; and
b) storing in the same or a different program storage device accessible by said client computer a form file containing said set of data used to complete the blank spaces in said blank form, said form file further containing information concerning time of creation of the data and a unique identification which distinguishes said form file from other forms, said unique identification including an identification for said blank form.

20. The system of claim 19 wherein said blank form is an HTML source file and step (b) includes storing said form file including said HTML source file combined with said set of data used to complete said source file.

21. The system of claim 19 wherein said blank form is an HTML source file and said form file includes a plurality of said sets of data.

22. The system of claim 21 wherein said program storage device containing said form file further includes a separate form table containing a list of said blank form HTML source files and information concerning time of saving of the source file and a unique identification for each source file, said separate form table being stored separately from said form file.

23. A process for entering data at a client computer in a form accessed from an intra- or internet source comprising:

providing a set of data in a form file in a program storage device accessible by said client computer, said data corresponding to data in a single previously filled-in form from an intra- or internet source having a plurality of data spaces, said form file further containing information concerning time of creation of the data and a unique identification which distinguishes said form file from other forms, said unique identification including an identification for said previously filled-in form from an intra- or internet source;

accessing a blank form from an intra- or internet source, said blank form having a plurality of blank data spaces for filling in data;

viewing said blank form on said client computer;

determining if the blank form accessed from the intra- or internet source corresponds to said previously filled-in form from an intra- or internet source by using said unique identification;

accessing said form file from said program storage device if it is determined that the blank form accessed from the intra- or internet source corresponds to said previously filled-in form from an intra- or internet source;

utilizing data from said form file to complete the blank data spaces in said blank form; and transmitting the completed blank form to said intra- or internet source.

24. The process of claim 23 wherein said form file includes an HTML source file previously accessed from an intra- or internet source combined with a set of data for said source file, and wherein said process includes accessing said form file from said program storage device and determining if said blank form corresponds to said form file.

25. The process of claim 23 wherein said form file includes an HTML source file previously accessed from an intra- or internet source combined with a set of data for said source file, and said program storage device further includes: i) a plurality of form files, each of which includes an HTML source file previously accessed from an intra- or internet source combined with a set of data for said source file and containing information concerning time of creation of the form and a unique identification, and ii) a combined form table containing a list of said form files, and wherein said process includes accessing said combined form table from said program storage device and determining if said blank form corresponds to said form file.

26. The process of claim 23 wherein said form file includes a plurality of sets of data, said sets of data being for a plurality of HTML source files previously accessed from an intra- or internet source, and wherein said process includes the step of accessing one of said sets of data to complete said blank form.

27. The process of claim 26 wherein said program storage device further includes a separate form table containing a list of a plurality of HTML source files previously accessed from an intra- or internet source and information concerning time of saving of the source file and a unique identification for each source file, and wherein said form file includes a plurality of sets of data, said sets of data being for said HTML source files, and wherein said process includes the step of accessing said separate form table from said program storage device and determining if said blank form corresponds to one of said HTML source files.

* * * * *

UNITED STATES PATENT AND TRADEMARK OFFICE
CERTIFICATE OF CORRECTION

PATENT NO. : 6,247,029 B1  
DATED : June 12, 2001  
INVENTOR(S) : Kelley et al.

Page 1 of 1

It is certified that error appears in the above-identified patent and that said Letters Patent is hereby corrected as shown below:

<u>Column 10, claim 13,</u>
Line 24, after "completed" delete "blank".

<u>Column 12, claim 23,</u>
Line 5, after "completed" delete "blank".

Signed and Sealed this

Nineteenth Day of February, 2002

Attest:

JAMES E. ROGAN
*Attesting Officer*   *Director of the United States Patent and Trademark Office*